US010812547B1

(12) United States Patent
Garavito et al.

(10) Patent No.: US 10,812,547 B1
(45) Date of Patent: Oct. 20, 2020

(54) BROADCAST STREAMING CONFIGURATION

(71) Applicant: Amazon Technologies, Inc., Seattle, WA (US)

(72) Inventors: Javier Justino Garavito, Mercer Island, WA (US); Stephen Gordon Dewhurst, Seattle, WA (US); Jeremiah William Habets, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 15/085,774

(22) Filed: Mar. 30, 2016

(51) Int. Cl.
*H04L 29/06* (2006.01)
*H04L 12/58* (2006.01)
*H04N 7/173* (2011.01)
*H04N 21/472* (2011.01)

(52) U.S. Cl.
CPC ........ *H04L 65/4084* (2013.01); *H04L 51/046* (2013.01); *H04L 65/4076* (2013.01); *H04L 67/42* (2013.01); *H04N 7/173* (2013.01); *H04N 21/472* (2013.01)

(58) Field of Classification Search
CPC ............. H04L 65/4084; H04L 65/4076; H04L 51/046; H04L 67/42
See application file for complete search history.

(56) References Cited

U.S. PATENT DOCUMENTS

| 10,440,082 B1* | 10/2019 | Winston | H04N 21/23805 |
| 2011/0295667 A1* | 12/2011 | Butler | G06Q 30/0239 |
| | | | 705/14.12 |
| 2013/0159384 A1* | 6/2013 | Funge | H04L 65/80 |
| | | | 709/203 |
| 2013/0326406 A1* | 12/2013 | Reiley | G06F 3/048 |
| | | | 715/810 |
| 2014/0310424 A1* | 10/2014 | Andersson | H04L 65/4084 |
| | | | 709/231 |
| 2016/0219084 A1* | 7/2016 | AbiEzzi | H04L 65/1089 |
| 2016/0232336 A1* | 8/2016 | Pitschel | G06F 21/305 |
| 2016/0294748 A1* | 10/2016 | Yang | G06Q 50/01 |
| 2017/0091428 A1* | 3/2017 | Johnson | G06F 21/10 |

* cited by examiner

Primary Examiner — Dhairya A Patel
(74) Attorney, Agent, or Firm — BakerHostetler

(57) ABSTRACT

A streaming server stores a plurality of parameter values for configuring a computing client node to stream output associated with a particular application. Upon receipt of a request to establish streaming relating to the particular application, the streaming server retrieves the relevant parameter values from the previously stored information and generates instructions for configuring the client device based upon the retrieved parameter values. The streaming server transmits the instructions to the client device which uses the received instructions to configure itself for streaming. The stream of output from the client device is received at the streaming server which transmits the stream to other devices that have requested to receive the output. In response to subsequent requests, the streaming server again retrieves the relevant parameter values from the previously stored information and generates instructions for configuring the client device.

12 Claims, 7 Drawing Sheets

FIG. 5

| User — 520 | Computing Node — 530 | Application — 540 | Parameter Values — 550 |
|---|---|---|---|
| . . . | . . . | . . . | . . . |
| Participant A | 110A | Game 1 | Value 1 – Video Encoder Type<br>Value 2 – Audio Encoder Type<br>Value 3 – Video Card Details<br>Value 4 – Audio Input/Output Details<br>. . . |
| Participant A | 110A | Game 2 | Value 1 – Video Encoder Type<br>Value 2 – Audio Encoder Type<br>Value 3 – Video Card Details<br>Value 4 – Audio Input/Output Details<br>. . . |

US 10,812,547 B1

BROADCAST STREAMING CONFIGURATION

BACKGROUND

In networked computing environments, there is frequently interest in broadcasting a user's on-line experience to others. For example, a person engaged in demonstrating the operation of an on-line software application may wish to broadcast her experience in operating the on-line software application so that interested persons may view and learn from the operation. A user of an on-line gaming system may be interested in streaming a broadcast of her on-line game playing experience to others who are interested in viewing the game play.

Creating and operating broadcast streams of on-line activities is labor intensive and often requires significant technical expertise. For example, establishing a broadcast of an on-line session frequently involves specifying technical details regarding the system at which the stream is to be captured. In an example scenario, creating a broadcasting stream may require specifying the type of video encoder that is to be used, a maximum bit rate of the video encoder, a value for quality balance, and whether or not constant bit rate encoding is to be used. Streaming audio output may require specifying a particular audio codec, a format of the encoding, and a bitrate. Additional parameters relating to streaming output that may require definition include the particular video adapter being used, the desired video resolution, the degree to which video resolution is to be downscaled, frames per second of the video, the particular speaker devices being used, and the microphone devices being used. Specifying values for a lengthy and complicated list of parameters often requires significant time and effort, even for a person with substantial technical expertise.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

FIG. 5 depicts a chart illustrating example data items and relationships between data items.

DETAILED DESCRIPTION

Figure 1:
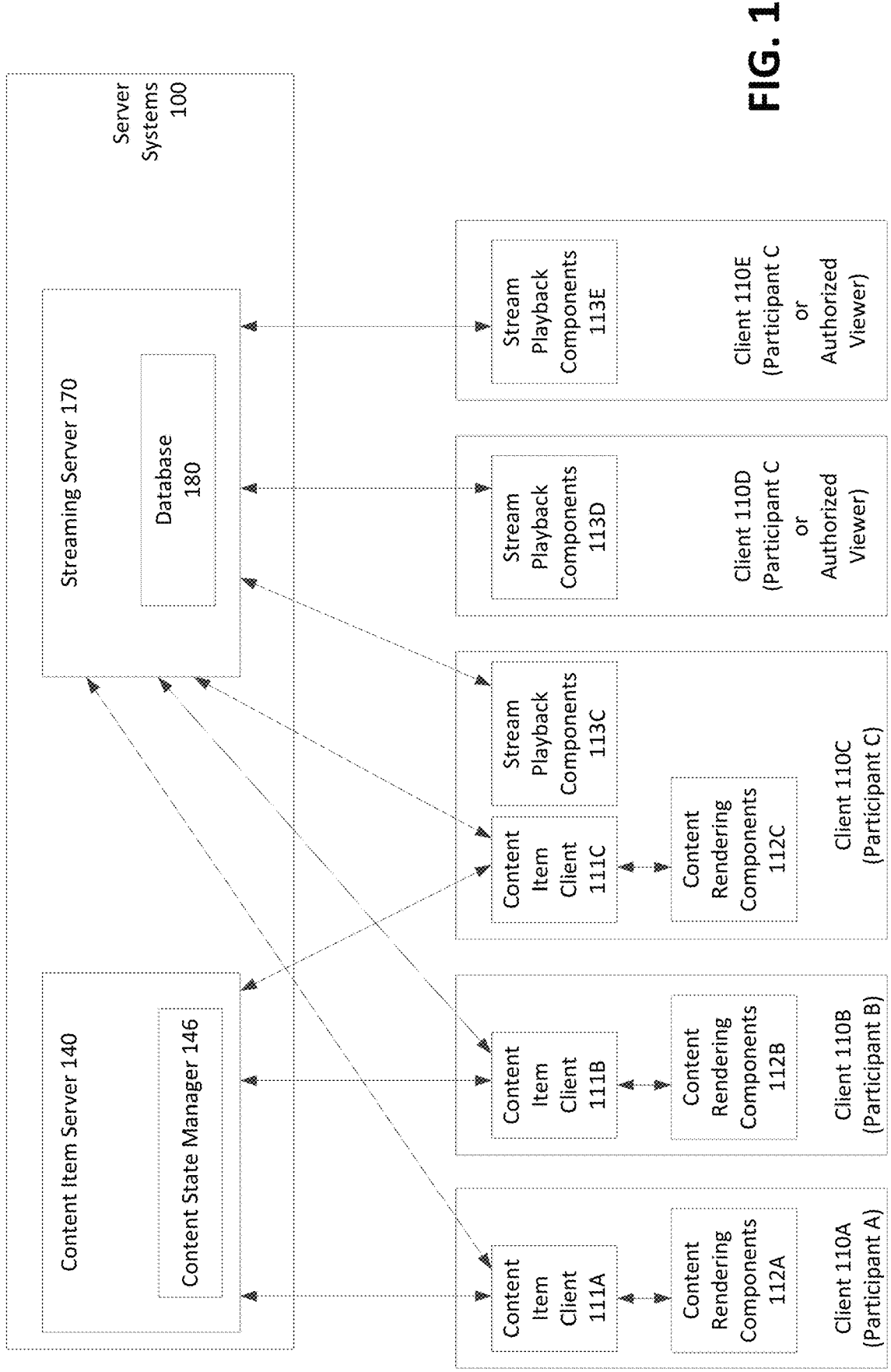
FIG. 1 depicts an example computing environment for content item distribution and output streaming.

In a typical scenario wherein a user wishes to have her interactions with a software application broadcast to others, the user needs to first specify values for a plurality of parameters relating to the broadcast. Due to the technical nature of the parameters and the number of parameters involved, providing values often requires a significant allocation of time. The task of defining such values is a recurring burden as parameter values that are established for a particular broadcast session need to be re-entered for subsequent broadcast sessions.

Applicants disclose herein systems and methods for automating streaming configuration. A streaming server receives and stores a plurality of parameter values for configuring a computing client node for streaming output associated with a particular application. Upon receipt of an indication that the client device wishes to establish streaming relating to the particular application, the streaming server retrieves the relevant parameter values from the previously stored information and generates instructions for configuring the client device based upon the retrieved parameter values. The streaming server transmits the instructions to the client device which uses the received instructions to configure itself for streaming. The stream of output from the client device is received at the streaming server which transmits the stream to other devices that have requested to receive the output. After the streaming session ends, and the user subsequently requests to initiate a new streaming session, the streaming server again retrieves the relevant parameter values from the previously stored information and generates instructions for configuring the client device based upon the retrieved parameter values.

In an example embodiment, a streaming server system is programmed to broadcast streams of data originating from client computing nodes to other client nodes that have been identified to receive a particular broadcast stream. A client node may also be communicatively coupled with an on-line service or application that is accessed by a user using the client node. For example, a client node may communicate with an on-line gaming server in connection with an on-line game play session. In an example scenario, it may be desired for the game play experience at the client node to be communicated to the streaming server, and communicated by the streaming server to client nodes that have been identified to receive the stream output.

In an example embodiment, the streaming server is programmed to receive information specifying values for parameters for streaming content associated with a particular application. In an example scenario, the streaming server may receive from the client node data specifying the particular user operating the client node along with details regarding the configuration of the client node for purposes of streaming output for a particular on-line game. The information received from the client node provides details regarding, for example, the node's video hardware, audio hardware, video encoding, and audio encoding. For example, with respect to video encoding, the data may specify a particular video encoder, a maximum bitrate, and whether or not the encoding was constant bit rate encoding. With respect to audio encoding, the data may specify a particular audio encoder, a format of the encoded data, and a bitrate. With respect to the video card employed by the particular client node, the data may comprise data identifying a type of video card, a base resolution, a number of frames per second, and any related information relating to operation of the video card. With respect to the audio hardware, the data may identify the particular type of speaker and microphone comprised in the client node and which is to be used during operation of the application.

In addition to receiving information relating to the technical configuration of the client node, the streaming server may additionally receive information regarding additional sources of input that may be included in the output stream from the client node. For example, the information may specify that during operation of the particular application, e.g., a gaming application, a web camera application is to be launched and positioned at a particular location on the client node interface, and the output from the web camera application included in the output stream. By way of further example, the information may specify that during operation of the particular application, a particular chat application is to be launched and positioned at a particular location of the client interface, and the output from the chat application included in the output stream. The received information may further specify values for any parameters needed to launch and operate the applications.

In an example embodiment, the information received at the streaming server may additionally comprise information specifying additional programs to which the parameter values should be applied. For example, the information may specify that in addition to a first game application, the parameter values should be applied to other game applications that may be launched by the particular user. In an example scenario, the information may specify that the parameter values may be applied to all game applications that may be launched by the user designated in the information. The received information may specify that the parameter values may be applied to games from a particular source or of a particular genre.

The information specifying values for parameters for streaming content associated with a particular application may be received at the streaming server via any suitable mechanism. In an example embodiment, the information may be received via a call by the client node to the streaming server using an application programming interface. The call may upload the relevant data, such as that discussed above, to the streaming server. In an example scenario, the process of receiving values for parameters for streaming data may involve the client node sending, and the streaming server receiving, a request to specify values for parameters. For example, the client node may transmit, and the streaming server may receive, a request for a user interface adapted to enter values for parameters. In response, the streaming server transmits information specifying parameters for streaming content. In an example scenario, the streaming server transmits data for creating a user interface display adapted to receive information specifying values for parameters for streaming content associated with the application. Where the streaming server transmits data for generating a user interface display, the client node receives the data and generates a user interface. The user enters values for parameters into the interface and the values are communicated to the streaming server.

Upon receipt of data specifying values for parameters for streaming content associated with an application, the streaming server stores the received data in computing memory. In an example embodiment, the data may be stored using any suitable technology such as, for example, a relational database that allows for the data be selectively stored and retrieved. In an example embodiment, the streaming server stores the received data in relation to data identifying the particular user, the particular client node, and the particular application to which it relates as well as in relation to any other suitable information. The data may also be stored in relation to applications other than the one in connection with the data was received in order to signify that the values of the parameters apply also to those additional applications. For example, where the data is received in connection with a first on-line gaming application, the received data may be stored in relation to data identifying additional gaming applications from a similar source or of a similar genre.

The streaming server subsequently receives a request to stream content associated with the particular application. In an example scenario, the request may be received from the client node. The request may be generated in response to a launching of the particular application by the user at the client node. For example, where the user of the client node launches a particular on-line game, the client node may also generate and transmit a request to stream the content associated with the on-line game. In another scenario, an on-line gaming application may have a user interface feature such as, for example, a button that when depressed causes a request to be generated and transmitted to the streaming server. In an example scenario, the request to stream content identifies the particular application as well as the particular user and computing node for which the request is made.

In response to the request, the streaming server retrieves from computing memory data specifying values for parameters for streaming content associated with the particular application. In an example scenario, the streaming server uses the information received with the request to stream content in order to retrieve the parameter values. For example, the streaming server employs information identifying the particular user, the particular application, and the particular computing node on which the application will be executing in order to retrieve the relevant parameter values. In an example embodiment, the streaming server queries a database in which data specifying parameter values has been stored. The streaming server retrieves the relevant data from the database in computing memory based upon one or more of the particular user, the particular application, and the particular computing node on which the application will be executing.

The streaming server uses the retrieved information to generate instructions for configuring the client node to stream content associated with the particular application. The retrieved parameter values are employed to identify settings that should be made on the client node. For example, where the retrieved parameter values indicate a particular video encoder with a maximum bit rate should be employed, the streaming server generates instructions to configure the client node to use the particular video encoder with the designated bit rate. Similarly, where the retrieved parameter values indicate a particular audio encoder and encoding bit rate is to be employed, the streaming server generates instructions to configure the client node to use the particular audio encoder and designated bit rate. By way of further example, where the retrieved parameter values indicate a web cam application and/or chat application is to be launched and the interface placed in a particular part of the user interface, the streaming server generates instructions to configure the client node to launch the web cam or chat application and place the interface at the designated location on the user interface. The streaming server transmits the generated instructions to the client node.

The client node receives the instructions and configures itself consistent with the received instructions. For example, where the received instructions indicate to configure the client node to use the particular audio encoder and designated bit rate, the client node does so. Where the received instructions indicate to configure the client node to launch the web cam application and place the interface at the designated location on the user interface, the client node launches the web cam application. Similarly, where the received instructions indicate a chat application is to be launched and the interface placed in a particular part of the user interface, the client node launches the chat application.

Once the client node has configured itself based upon the received instructions, the client node may be operated to interface with the particular application. For example, where the application is a game application, the operator of the client node may operate to play the game application. In an example scenario, where the client node has been configured, based upon the received instructions, to launch a web cam application and/or a chat application, the web cam application and/or chat application are launched and the operator may use those applications while executing the game application.

Pursuant to the instructions received from the streaming server, the output from the client node is streamed to the streaming server. For example, where the client node is being used to participate in a game application, and the user has a web cam application and chat application executing, the output from the game application, the web cam application, and chat application may be streamed to the streaming server.

The stream of content from the client node is received at the streaming server. The streaming server is programmed to broadcast streams of content to client nodes that have requested a particular broadcast stream such as one associated with a particular user or client node. In an example scenario, one or more subscribers to the streaming server may have requested or subscribed to receive broadcast streams received from the particular user at the particular client node to which instructions have been sent and from which the output stream is being received. For purposes of this disclosure, a subscriber may be any person that requests to view a game session and may be referred to herein interchangeably as either a viewer or subscriber. Streaming server identifies the subscribed nodes by querying its database where subscription or viewer information is stored. The streaming server then transmits or broadcasts the stream of content to the identified nodes.

According to another aspect of the disclosed embodiments, the streaming server may stream the content to the particular client node from which the stream is originating. In an example embodiment, the parameter value information received from the client node may specify that the client node should also receive the stream from the streaming server. In such a scenario, the streaming server transmits the output stream to the client node, which displays the output in a portion of the display area.

It will be appreciated that the parameter values that are stored at the streaming server are available to be used repeatedly each time the user requests to perform streaming in connection with the particular application. Accordingly, when the user subsequently requests to initiate a new streaming session, the streaming server again retrieves the relevant parameter values from the previously stored information and generates instructions for configuring the client device based upon the retrieved parameter values. Moreover, a single set of parameter values that are stored at the streaming server may be designated as corresponding to multiple applications. Accordingly, when the user indicates an intention to stream output associated with any one of the multiple applications, the streaming server is programmed to retrieve the parameter values and communicate those for purposes of configuring the device to stream output from the particular application.

Example Computing System

FIG. 1 is a diagram illustrating an example system suitable for automated streaming configuration. In an example embodiment, a system comprises server systems 100 and client systems or nodes 110A-E. Server systems 100 comprise content item server 140 and streaming server 170. Content item server 140 is programmed to provide content services such as gaming services to client devices. Streaming server 170 is programmed to stream output related to applications such as those that interact with content item server 140. Server systems 100 and client nodes 110A-E are programmed to communicate with one another, such as over one or more communication networks, including, for example, one or more local area networks (LAN's) and wide area networks (WAN's), such as the Internet. Server systems 100 may be distributed across any number of different servers and/or devices, at any number of different locations, which may themselves communicate over any number of different communications networks.

As shown in FIG. 1, clients 110A-C each include a respective content item client 111A-C which correspond to and communicate with content item server 140. Content item clients 111A-C and content item server 140 may collectively execute a content item. A content item may be any computing functionality which, in the example instance of FIG. 1, comprises a portion executing on content item server 140 and a portion executing on client devices 110A-C. In an example scenario, the content item may be a massively multiplayer online (MMO) video game or other video game. It will be appreciated, however, that the techniques described herein may also be applied to any suitable content including, for example, single-participant content items, such as single-player video games, or even non-gaming functionality.

Persons operating client devices 110A-C, who in the gaming context may be referred to as players or participants, log on or otherwise connect to the content item using content item clients 111A-C. In the example scenario depicted in FIG. 1, client 110A is operated by Participant A, client 110B is operated by Participant B, client 110C is operated by Participant C. In an example embodiment, participants connect to the content item by providing, via content item clients 111A-C, identity and authentication information, such as a user name and password, which may be matched by server components 100 to an existing username and password for the participant.

In the scenario wherein the content item is a game, each content item client 111A-C may, on behalf of a respective player or participant, control a respective character or other participant-controlled entity within the content item. Each content item client 111A-C receives participant input information, such as may be provided though one or more user input components (e.g., touch screen, controller, camera, microphone, mouse, keyboard, etc.) at clients 110A-C. For example, participants may provide input for controlling respective characters, such as by performing various actions (e.g., firing a weapon, driving a car, moving from one location to another, etc.). Upon receiving the participant input information, content item clients 111A-C collect and forward content state data associated with the user input to the content item server 140.

Upon being received by content item server 140, incoming content state data from content item clients 111A-C may be provided to content state manager 146. Content state manager 146 generally perform operations related to communication of content item state among content item clients 111A-C. For example, in some cases, content state manager 146 may identify an update to content state data from one of content item clients 111A-C and then forward the update to each other content item client 111A-C, such that each of content item clients 111A-C are able to update and maintain respective versions of the state of the content item. For example, each of content item clients 111A-C may, in some cases, receive, from content state manager 146, updates regarding actions performed by other characters controlled by other content item clients 111A-C.

In addition to forwarding information about participant-controlled characters, content item server 140 may also provide, to content item clients 111A-C, information about other objects within a virtual area of the content item. For example, content item server 140 may provide information about objects such as trees, clouds, lakes, rivers, cliffs, birds, fish, animals, structures, vehicles, non-player characters (NPC's), and many other objects. The provided information may include, for example, any information associated with rendering of the objects at the respective clients 110A-C, such as location, orientation, size, color, texture, shading, lighting, reflectivity, associated audio data, and any other associated information.

Upon being received by content item clients 111A-C, the state, object, and other content item information from content item server 140 may be processed and then used to render image data, such as video data, associated with the content item. In particular, content item clients 111A-C may provide the received content item information to respective content rendering components 112A-C for rendering of image data, such as video data, associated with the content item. In greater detail, for example, content rendering components 112A-C may include one or more graphics processing units (GPU's) for rendering of image data, such as video data, as well as various audio processing components for processing and rendering of audio data. As should be appreciated, the GPU's and/or other image data processing components may perform various graphics rendering operations, such as geometry operations, shading, texturing, lighting, and other graphics pipeline operations. Upon being rendered, the image and audio data associated with the content item may be presented using one or more output devices (e.g., display screen, speakers, etc.).

Referring to FIG. 1, streaming server 170 is adapted to stream output received from client nodes 110 to other client nodes. For example, in the scenario where a participant A is operating a gaming application on device 110A, the output rendered on device 110A may be communicated to streaming server 170. Streaming sever 170 communicates the streamed output to client nodes that have requested or subscribed to receive the output from device 110A. In an example scenario wherein client nodes 110D and 110E have previously subscribed with streaming server 170 to receive output from Participant A executing a particular content item such as a particular game, streaming server 170 streams the output content stream received from client node 110A to nodes 110D and 110E. Streamed image and audio data received from streaming server 170 at client nodes 110D and 110E is presented to Participants D and E, respectively, by respective stream playback components 113D and E via output components, such as, for example, a display screen and audio speakers. Stream playback components 113C-E may include any components that are capable of playing streamed image and audio data, such as a web browser, various well-known video and/or audio players, and the like. It will be appreciated that client nodes 110 may have both a content item client 111 component and stream playback component 113. According, client nodes 110A-E may be used both to participate in a content item such as a game application, as well as view the output stream generated by a user participating in a content item.

In a scenario wherein a user wishes to have her interactions with a software application or service broadcast to other persons, the user is required to first specify values for a plurality of parameters relating to the broadcast. For example, in the scenario wherein Participant A operating client node 110A wishes to have her interactions with content item 111A, which may be a gaming client, broadcast to other nodes such as, for example, nodes 110D and 110E, values for parameters relating to the broadcast need to be provided to streaming server 170. For example, values for parameters regarding the particular video encoder and audio encoder that are to be used need to be specified. Also, if the participant wishes the output from any additional applications such as a web camera application and/or a text chat application to be included in the output, information specifying as much needs to be provided to streaming server 170.

Streaming server 170 is programmed to automate streaming configuration. Streaming server 170 is programmed to receive values for parameters related to streaming of content associated with a particular content item application from a particular node such as, for example, node 110A. Streaming server 170 stores in database 180 the received parameter values along with information identifying the particular user or participant, the particular node, and the particular application. When streaming server 170 subsequently receives an indication the user wishes to stream content associated with the particular application, stream server 170 retrieves the relevant parameter values from database 180 in computing memory. Streaming server 170 generates instructions for configuring the particular device based upon the retrieved parameter values, and transmits the instructions to the relevant node, e.g., node 110A. The node that receives the instructions uses the instructions to configure itself to stream its video and audio output to streaming server 170. Streaming server 170 communicates the received content stream to nodes that have requested to view or subscribed to receive the streamed output. When the streaming session has ended and the user of node 110A again requests to perform a streaming session, streaming server 170 generates and transmits instructions for configuring the device and forwards the received stream to the subscribed client nodes.

Example Configuration Processing

Figure 2:
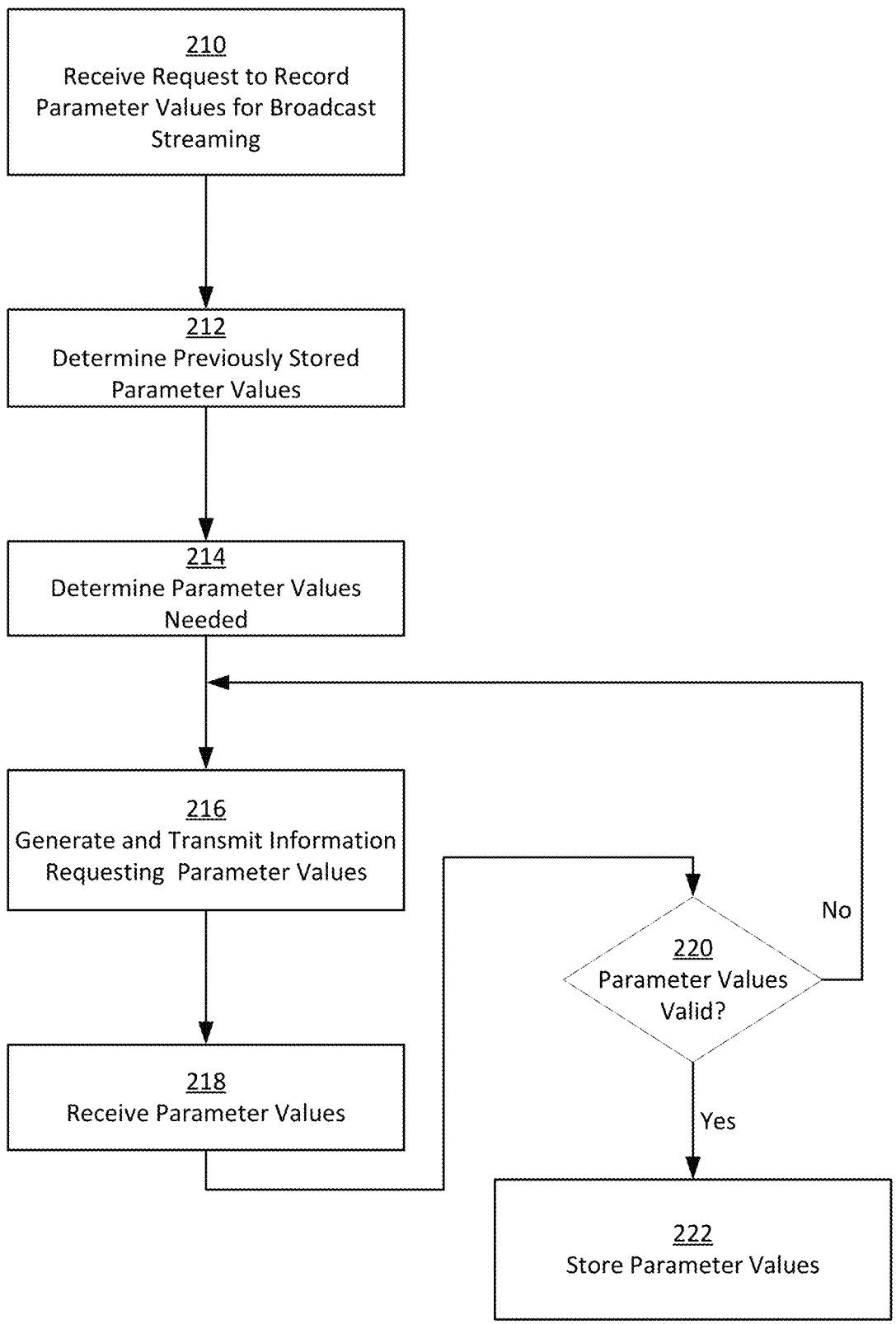
FIG. 2 depicts a flow diagram of example processing for receiving streaming configuration parameter values.

Streaming server 170 is programmed to receive information specifying values for parameters for streaming content associated with a particular user operating a particular application. The parameter values may be received at streaming server 170 via any suitable mechanism. FIG. 2 depicts a flow diagram of an example process for receiving parameter values used in a process of automated streaming configuration. As show, at block 210, streaming server 170 receives a request to record parameter values for broadcast streaming. In an example scenario, a request may be received from client node 110A via an application programming interface. The request identifies a particular user responsible for the request, a particular content item or application for which the streaming is intended to take place, and a particular node on which the application is to be executing. In an example scenario, the request may include information identifying the request is from Participant A and relate to a particular content item or program 111A executing on client device 110A. It will be appreciated that the request may originate from a content item client, e.g., content item client 111A, which provides a client user interface to a content item such as a video game. In such an scenario, the user interface may contain a feature such as a button that when depressed causes a request to be generated and forwarded to streaming server 170.

At block 212, streaming server 170 determines previously stored parameter values corresponding to the user from whom the request originated and to the identified device. For example, where the request is from Participant A at client node 110A, streaming server 170 identifies information relating to Participant A and client node 110A that has been previously stored by streaming sever 170. In an example embodiment, streaming server 170 queries database 180 having stored therein configuration parameters for parameter values relating to the particular user and client device. In an example scenario, streaming server 170 may identify parameter values stored by Participant A in connection with client device 110A and a different application than the one for which the request was received. In another example scenario, streaming sever 170 may identify that there are no previously stored parameter values relating to Participant A and/or client device 110A.

At block 214, streaming server 170 determines parameter values that need to be defined in view of any previously stored information that may apply to the particular request. For example, in the scenario where streaming server 170 has determined that some previously stored parameter values for the particular user and client device apply to the current request, streaming server 170 determines parameter values that do not apply to the current request and which require definition. In the scenario where streaming server 170 has determined that there are no previously stored values for the particular requesting user for the designated node, at block 214, streaming server 170 identifies all parameters that require values.

At block 216, streaming server 170 generates and transmits information requesting parameter values that require to be defined for purposes of streaming output relating to the particular application for the particular user at the particular node. For example, in the scenario wherein Participant A at client node 110A has indicated an interest in streaming output from content item client 111A, streaming server 170 generates and transmits information requesting parameter values that require definition. The information identifies the parameters that require definition and may suggest potential values for selection. In an example scenario, the streaming server creates and transmits data for creating a user interface display adapted to receive information specifying values for parameters for streaming content associated with the application. Where the streaming server transmits data for generating a user interface display, the client node receives the data and generates a user interface. The user enters values for parameters into the interface and the values are communicated to the streaming server.

Figure 4:
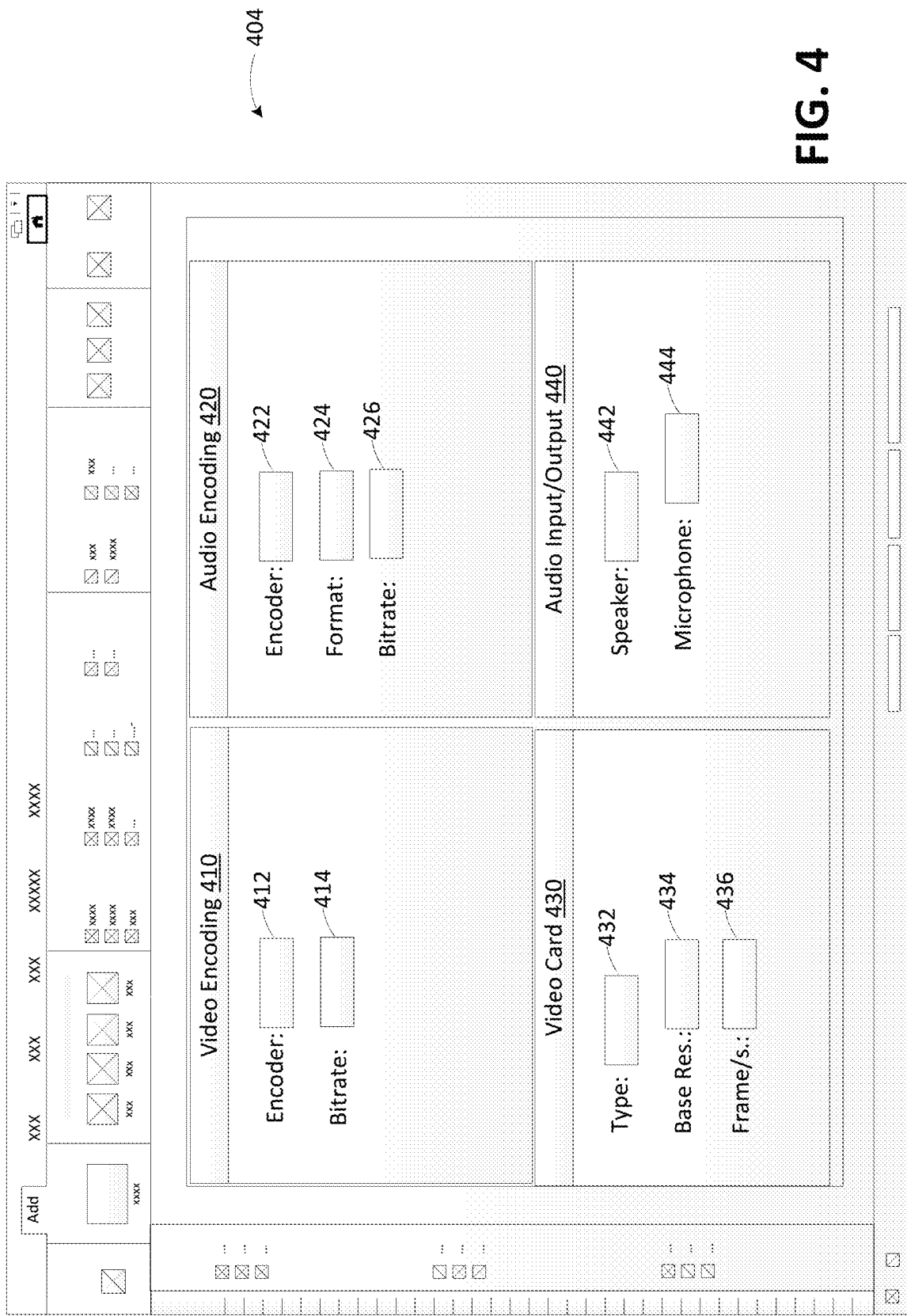
FIG. 4 depicts an example user interface for receiving configuration parameter values.

FIG. 4 depicts an example user interface 404 generated by the instructions generated and transmitted by streaming server 170. As shown, example user interface 404 has four topical sections: video encoding 410; audio encoding 420; video card characteristics 430; and audio characteristics 440. Video encoding section 410 provides user interface features 412 and 414 for entering values for parameters relating to video encoding. In example section 410, a user may enter information identifying the type of video encoding to be used in the streaming output and the bitrate of the encoding. Audio encoding section 420 provides user interface features 422, 424, and 426 for entering values for parameters relating to audio encoding. In an example section 420, a user may enter information identifying the type of audio encoder to be used, the format of the encoding, and the bitrate of the encoding. Video card section 430 provides user interface features 432, 434, and 436 in which values may be entered for parameters relating to the video card in use on the system. In example section 430, a user may enter information identifying the particular type of video card, a base resolution associated with the card, and the frames per second to be used. Audio characteristics section 440 provides user interface features 442 and 444 in which values may be entered for parameters relating to the audio features of the computing system. In an example section 440, a user may enter information identifying details regarding the speaker and microphone that are comprised in the particular system.

At block 218, streaming server 170 receives information specifying values for parameters for use in streaming output relating to a particular application. In an example scenario, streaming server 170 may receive from the client node data specifying the particular user who is operating client node 110A along with details regarding the configuration of client node 110A for purposes of streaming output for a particular on-line game 111A. The information received from client node 110A provides details regarding, for example, the node's video hardware, audio hardware, video encoding, and audio encoding. For example, with respect to video encoding, the data may specify a particular video encoder, a maximum bitrate, and whether or not the encoding was constant bit rate encoding. With respect to audio encoding, the data may specify a particular audio encoder, a format of the encoded data, and a bitrate. With respect to the video card employed by the particular client node, the data may comprise data identifying a type of video card, a base resolution, a number of frames per second, and any related information relating to operation of the video card. With respect to the audio hardware, the data may identify the particular type of speaker and microphone comprised in the client node and which is to be used during operation of the application.

In addition to receiving information relating to the technical configuration of the client node, streaming server 170 may additionally receive information regarding additional sources of input that may be included in the output stream from client node 170. For example, the information may specify that during operation of the particular application 111A, a web camera application is to be launched and positioned at a particular location on the client node interface, and the output from the web camera application included in the output stream. By way of further example, the information may specify that during operation of the particular application 111A, a particular chat application is to be launched and positioned at a particular location of the client interface, and the output from the chat application included in the output stream. The received information may further specify values for any parameters needed to launch and operate the applications.

In an example embodiment, the information received at streaming server 170 may additionally comprise information specifying additional programs to which the parameter values should be applied. For example, the information may specify that in addition to a first game application, e.g., 111A, the parameter values should be applied to particular other game applications that may be launched by the user from client device 110A. In an example scenario, the information may specify that the parameter values may be applied to all game applications that may be launched by the user from client device 110A. In another example scenario, the information may specify that the parameter values may be applied to games from a particular source or of a particular genre.

The information specifying values for parameters for streaming content associated with a particular application may be received at streaming server 170 via any suitable mechanism. In an example embodiment, the information may be received via a call by client node 110A to streaming server 170 using an application programming interface. The call may upload the relevant data, such as that discussed above, to streaming server 170.

Referring to FIG. 2, at block 220 streaming server 170 evaluates the received parameter values and determines whether the received values are valid. For example, streaming server 170 determines whether the values are inconsistent with acceptable values for parameters. In an example scenario, streaming server 170 may determine that a submitted value for a parameter exceeds a limit for the parameter. In another example scenario, streaming server 170 may determine that a submitted value for a parameter is inconsistent with a known hardware configuration of the client node as specified in database 180. If at block 220, streaming server determines that there are invalid values for parameters, processing returns to block 216 where a request is made to provide parameter values.

In the situation that the parameter values are found to be valid, at block 222 streaming server 170 stores the values for the parameters in database 180 comprised in computing memory. In an example embodiment, the data may be stored using any suitable technology such as, for example, a relational database that allows for the data be selectively stored and retrieved. In an example embodiment, streaming server 170 stores the received data in relation to data identifying the particular user, e.g., Participant A, the particular client node, e.g., client 110A, and the particular application 111A to which it relates as well as in relation to any other suitable information. FIG. 5 depicts a chart illustrating example data items and relationships between data items as stored by the system. As shown, the parameter values 510 that are received are stored in relation to the particular user 520, computing node 530, and application 540 to which the values 550 apply. Accordingly, given a particular user's request to stream output from a particular application at a particular node, streaming server 170 is able to retrieve the relevant parameter values for configuring the node for the streaming session. The data may also be stored in relation to applications other than the one in connection with the data was received in order to signify that the values of the parameters apply also to those additional applications. For example, where the data is received in connection with a first on-line gaming application, the received data may be stored in relation to data identifying additional gaming applications from a similar source or of a similar genre. For example, as shown in FIG. 5, the parameter values 1-4 are stored in relation to not only Game 1, but also Game 2, which indicates the parameter values apply to streaming of both games.

Figure 3:
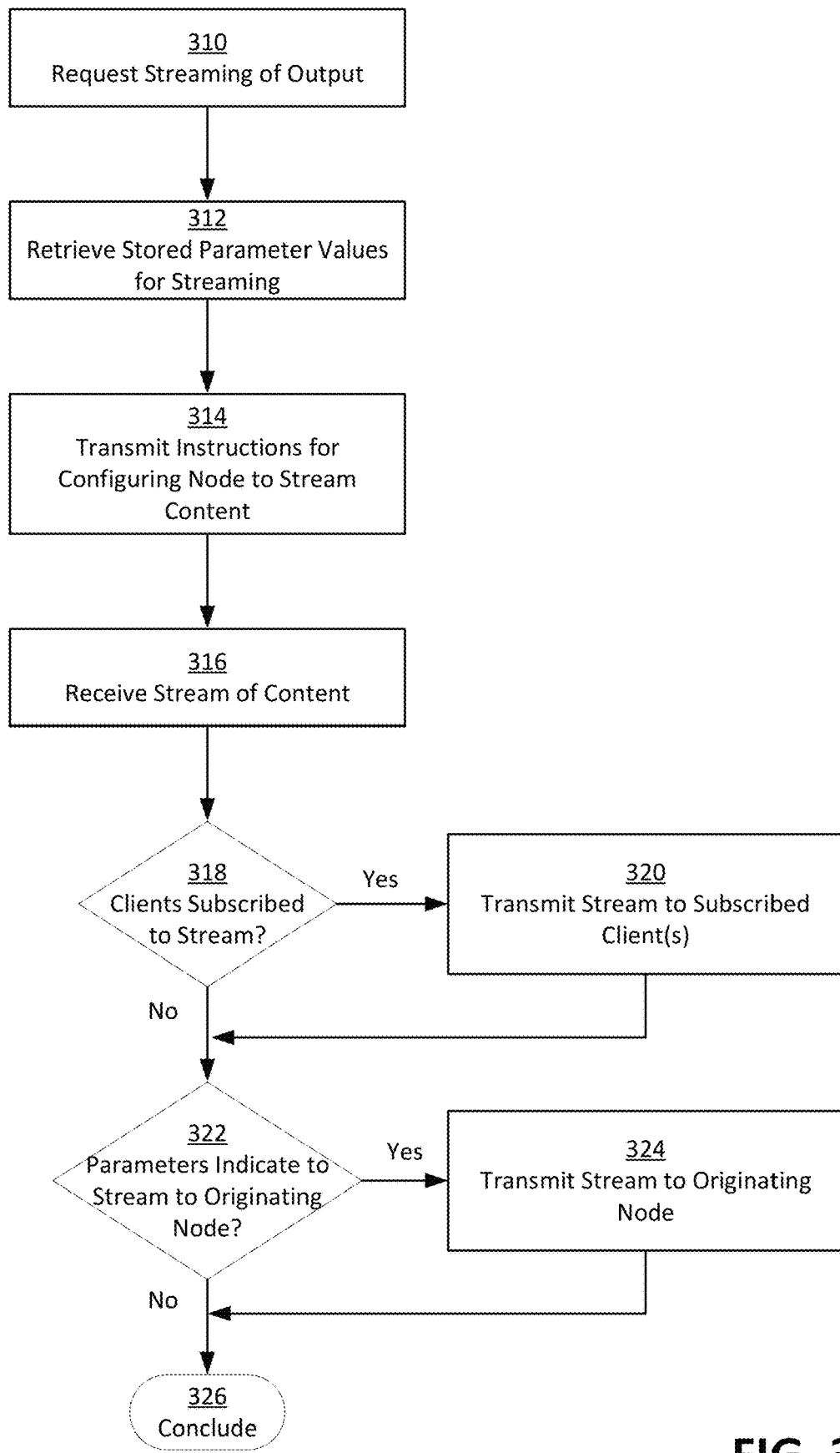
FIG. 3 depicts a flow diagram of example processing for configuring a computing node to stream output.

After the values for the streaming parameters have been stored in database 180, streaming server 170 is able to retrieve and use the stored values to establish streaming sessions with client devices. FIG. 3 provides a flow diagram of example processing of requests to perform broadcast streaming. As shown, at block 310, streaming server 170 receives a request from a client node to stream content associated with a particular application. In an example scenario, streaming server 170 may receive a request from Participant A at client node 110A to stream output from operating content item 111A, which may be, for example, a video game. The request from node 110A may be generated in any suitable manner. For example, where Participant A operating client node 110A launches on-line game 111A, client node 110A may also generate and transmit a request to stream the content associated with the game session. In another scenario, gaming application 111A may have a user interface feature such as, for example, a button that when depressed by Participant A, causes a request to be generated and transmitted to streaming server 170. In an example embodiment, the request to stream content identifies the particular application as well as the particular user and computing node for which the request is made. For example, a request to stream content from client node 110A identifies Participant A, client node 110A, and content item client 111A.

In response to a request from a client device, at block 312, streaming server 170 retrieves from database 180 in computing memory data specifying values for parameters for streaming content associated with the particular application. Streaming server 170 uses the information received with the request in order to retrieve the relevant parameter values. In an example scenario where a request to stream content relating to client application 111A was received from Participant A at client node 110A, at block 312 streaming server 170 employs information identifying Participant A, node 110A, and application 111A in order to retrieve the relevant parameter values. In an example embodiment, streaming server 170 queries database 180 in which data specifying parameter values has been stored. In an example embodiment wherein the data is stored so as to maintain relationships such as depicted in FIG. 5, the relevant parameter values may be readily retrieved.

At block 314, streaming server 170 uses the retrieved information to generate and transmit instructions for configuring the client node to stream content associated with the particular application. The retrieved parameter values are employed to identify settings that should be made on the client node. In an example scenario wherein the request was received from Participant A to stream output relating content item 111A executing at client node 110A, streaming server 170 generates instructions for configuring client node 110A to stream output relating to content item 111A. In the example instance where the retrieved parameter values indicate a particular video encoder with a maximum bit rate should be employed, the streaming server generates instructions to configure the client node to use the particular video encoder with the designated bit rate. Similarly, where the retrieved parameter values indicate a particular audio encoder and encoding bit rate is to be employed, the streaming server generates instructions to configure the client node to use the particular audio encoder and designated bit rate. By way of further example, where the retrieved parameter values indicate a web cam application is to be launched and the interface placed in a particular part of the user interface, the streaming server generates instructions to configure the client node to launch the web cam application and place the interface at the designated location on the user interface. Similarly, where the retrieved parameter values indicate a chat application is to be launched and the interface placed in a particular part of the user interface, the streaming server generates instructions to configure the client node to launch the chat application and place the interface at the designated location on the user interface.

The client node receives the instructions and configures itself consistent with the received instructions. For example, where client node 110A receives instructions to configure itself to use a particular audio encoder and designated bit rate, client node 110A does so. Where the received instructions indicate to configure client node 110A to launch a web cam application and place the interface at the designated location on the user interface, client node 110A launches the web cam application. Similarly, where the received instructions indicate a chat application is to be launched and the interface placed in a particular part of the user interface, client node 110A launches the chat application.

Once the client node has configured itself based upon the received instructions, the user may operate the application for which the output is to be streamed. For example, Participant A may execute content item 111A, which may be a game application, on node 110A. In an example scenario, based upon the received instructions, client node 110A may also launch a web cam application and/or a chat application. The output from the client node is streamed to streaming server 170. For example, where Participant A is using client application 111A and is also operating a web cam application and chat application, the output from the game application, the web cam application, and chat application is streamed to streaming server 170.

Referring again to FIG. 3, at block 316, streaming server 170 receives the stream of content from client node 110A. Streaming server 170 is programmed to broadcast streams of content to client nodes that have requested a particular broadcast stream such as one associated with a particular user or client node. Streaming server 170 may have stored in database 180 data identifying particular individuals, i.e. viewers or subscribers, and details regarding the particular computing system to which data is to be streamed. At block 318, streaming server 170 queries database 180 of viewers or subscribers of streaming content to identify nodes that have requested or subscribed to streams from the particular user, at the particular node, and relating to a particular application. In an example scenario, an authorized viewer at client node 110D and a viewer at client node 110E have requested to receive output streams from Participant A executing application 111A on Device 110A. In such a scenario, at block 318, determines to stream output received from Participant A executing application 111A on Device 110A to devices 110D and 110E. If at block 318 it is determined that nodes have requested to receive a stream of content from a particular device, at block 320 streaming server 170 transmits the stream to the subscribing devices.

In some instances, the operator of a gaming application may wish to see the streaming output. In such a scenario, the parameter values received from the requesting device at block 218 described above may indicate that the requesting device should receive the output stream as well. At block 322, streaming server 170 refers to the data stored in database 180 to determine whether or not a value in the received parameter value indicates the requesting individual and corresponding node should receive the streaming output. If so, processing continues at block 324 where streaming server 170 transmits the stream to the node from which the stream originates. In an example scenario wherein the request originated from client device 110A, streaming server 170 transmits the stream to client device 110A where the stream output may be displayed on Participant A's heads-up-display. The Participant A is thereby able to view the stream as experienced by subscribing nodes.

It will be appreciated that the parameter values that are stored by streaming server 170 in database 180 are available to be used repeatedly each time the user requests to perform streaming in connection with the particular application. Accordingly, in an example scenario wherein Participant A subsequently requests to initiate a new session of streaming output relating to executing of application 111A at node 110A, streaming server 170 again retrieves the relevant parameter values from database 180 and generates instructions for configuring client device 110A based upon the retrieved parameter values.

It will further be appreciated that a single set of parameter values that are stored by streaming server 170 in database 180 may be designated as corresponding to multiple applications and, therefore, may be used to prepare a node for streaming relating to any of the multiple applications. In an example scenario wherein streaming server 170 has received parameter values from Participant A at node 110A that indicate parameter values relating to content item 111A are to also relate to a second content item, when Participant A requests to stream output relating to the second content item, the set of parameter values relating to content item 111A will be applied in configuring node 110A for streaming of the second application. Users may designate the particular applications to which parameter values apply by any suitable manner of designation. For example, the users may designate the specific applications and/or may designate characteristics of the applications such as the game genre, manufacturer, or the node from which the game is launched.

Accordingly, per the example processing illustrated in connection with FIGS. 1-3, parameter values are stored and subsequently employed to automatically configure client nodes for streaming output relating to particular applications.

Example Processing Architecture

Figure 6:
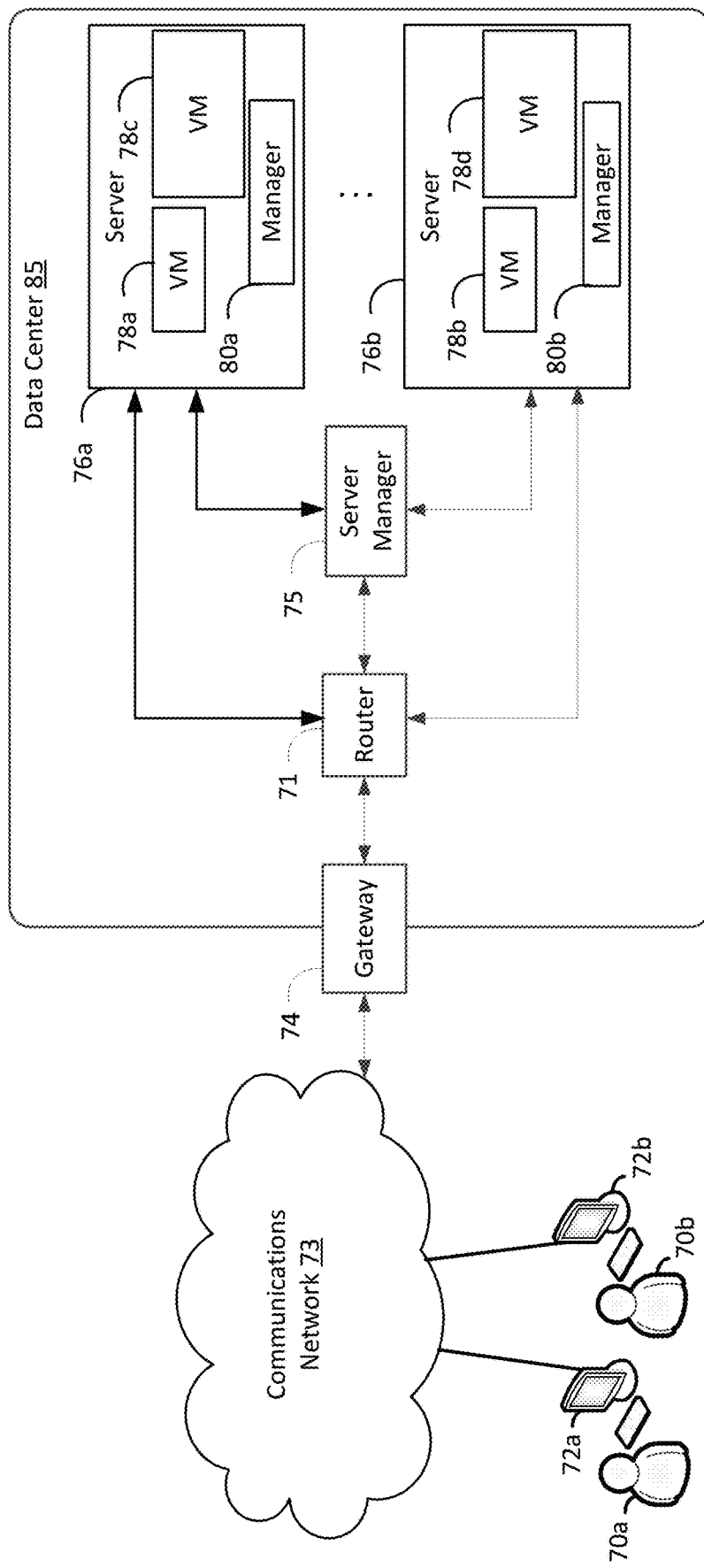
FIG. 6 depicts an example computing arrangement for implementing network accessible services.

It will be appreciated that the processing described in connection with FIGS. 2 and 3 may be comprised in a system architecture adapted to provide web services or cloud based services. Client nodes 110A-E may access the server systems 140 and 170 via any suitable networking system which may comprise the Internet and/or World Wide Web. FIG. 6 depicts an example operating environment suitable for providing on-line services such as those described herein in connection with servers 140 and 170.

FIG. 6 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). In an example embodiment, virtual machine instances 78c and 78d may be instances of content item server 140 and/or streaming content server 170. The virtual machine instances 78c and 78d may be configured to perform all, or any portion, of the techniques for providing content items such as gaming services and/or streaming services and/or any other of the disclosed techniques in accordance with the present disclosure and described in detail above. As should be appreciated, while the particular example illustrated in FIG. 6 includes one virtual machine in each server, this is merely an example. A server may include more than one virtual machine or may not include any virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 6 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 6, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 6, a server manager 75 is also employed to at least in part direct various communications to, from and/or between servers 76a and 76b. While FIG. 6 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 85 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 7:
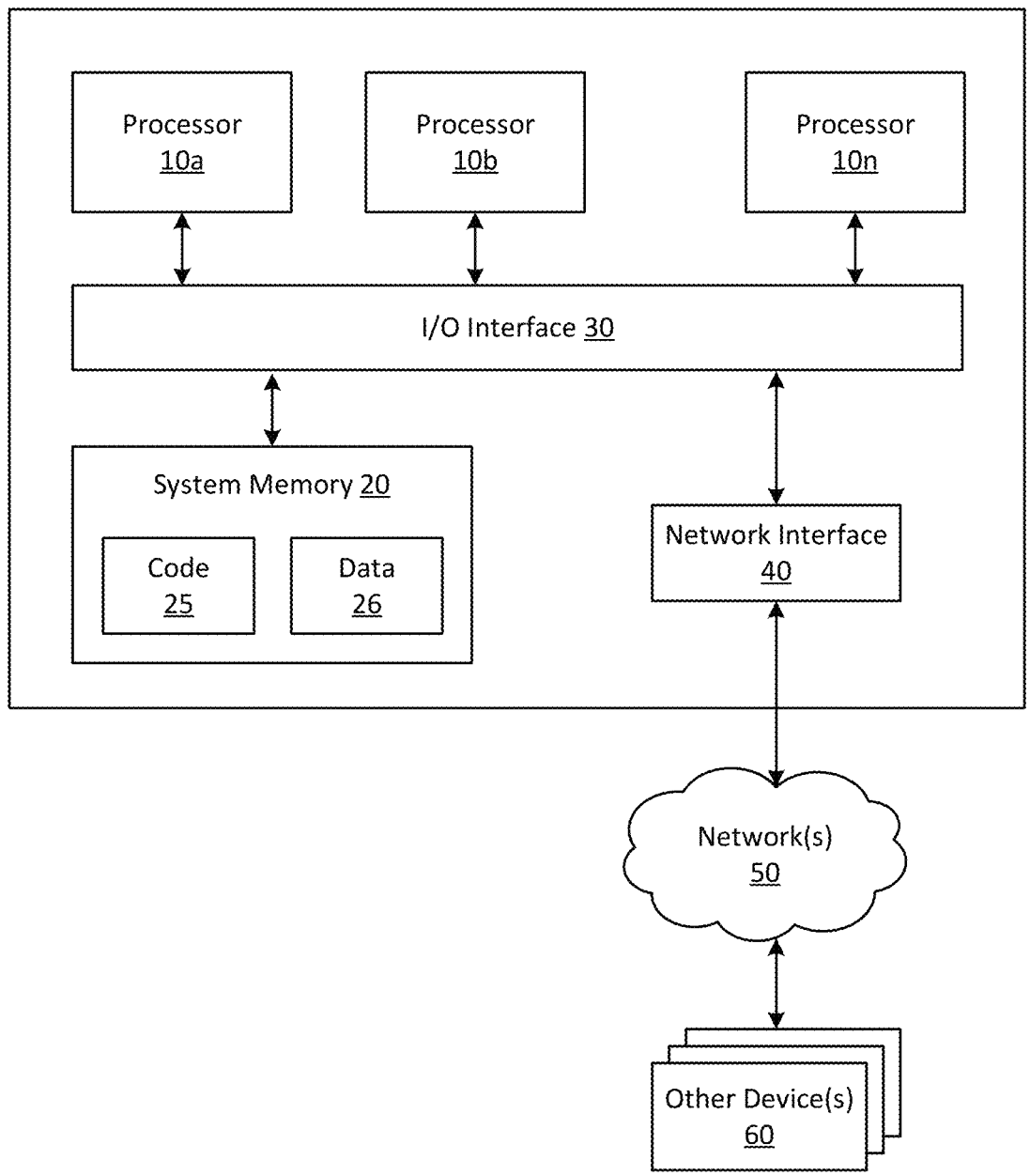
FIG. 7 depicts an example computing system.

In at least some embodiments, client nodes 110A-E and servers such as servers 140 and 170 that implement a portion or all of one or more of the technologies described herein may include a computer system that includes or is configured to access one or more computer-accessible media. FIG. 7 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
one or more processors; and
one or more non-transitory computer-readable storage media having stored thereon instructions that cause the one or more processors to perform operations comprising:
storing, by a second computing node, in computing memory, data specifying values for parameters for configuring a first computing node, wherein the values for the parameters are specified by a user operating the first computing node for configuration of the first computing node to stream, via a first streaming session, first content associated with a first videogame application;
receiving, by the second computing node, a request from the first computing node for the first computing node to stream, via a second streaming session, second content associated with a second video game application;
retrieving from the computing memory the data specifying the values for the parameters;
transmitting, by the second computing node, based upon the data specifying the values for the parameters, instructions for configuring the first computing node to stream, via the second streaming session, the second content associated with the second video game application;
receiving, by the second computing node, via the second streaming session, a stream of the second content associated with the second video game application from the first computing node; and
broadcasting the stream of the second content to one or more nodes that have requested to receive the stream of the second content.

2. The system of claim 1,
wherein transmitting instructions for configuring the first computing node to stream the second content associated with the second video game application comprises transmitting instructions to activate a game client, a video camera, a microphone, and a chat application.

3. The system of claim 2,
wherein receiving a stream of the second content associated with the second video game application from the first computing node comprises receiving a stream of content generated by the game client and one or more of the video camera, the microphone, and the chat application.

4. The system of claim 1,
wherein broadcasting the stream of the second content to one or more nodes that have requested to receive the stream of the second content comprises streaming the second content to the first computing node.

5. A computer-implemented method comprising:
storing, by a second computing node, in computing memory, data specifying values for parameters for configuring a first computing node, wherein the values for the parameters are specified by a user operating the first computing node for configuration of the first computing node to stream, via a first streaming session, first content associated with a first video game application;

receiving, by the second computing node, a request from the first computing node for the first computing node to stream, via a second streaming session, second content associated with a second video game application;
retrieving from the computing memory the data specifying the values for the parameters;
transmitting, by the second computing node, based upon the data specifying the values for the parameters, instructions for configuring the first computing node to stream, via the second streaming session, the second content associated with the second video game application;
receiving, by the second computing node, via the second streaming session, a stream of the second content associated with the second video game application from the first computing node; and
broadcasting the stream of the second content to one or more nodes that have requested to receive the stream of the second content.

6. The computer-implemented method of claim 5,
wherein transmitting instructions for configuring the first computing node to stream the second content associated with the second video game application comprises transmitting instructions to activate a game client, a video camera, a microphone, and a chat application.

7. The computer-implemented method of claim 6,
wherein receiving a stream of the second content associated with the second video game application from the first computing node comprises receiving a stream of content generated by the game client and one or more of the video camera, the microphone, and the chat application.

8. The computer-implemented method of claim 5,
wherein broadcasting the stream of the second content to one or more nodes that have requested to receive the stream of the second content comprises streaming the second content to the first computing node.

9. One or more non-transitory computer-readable storage media having stored thereon instructions that, upon execution on at least one computing device, cause the at least one computing device to perform operations comprising:
storing, by a second computing node, in computing memory, data specifying values for parameters for configuring a first computing node, wherein the values for the parameters are specified by a user operating the first computing node for configuration of the first computing node to stream, via a first streaming session, first content associated with a first video game application;
receiving, by the second computing node, a request from the first computing node for the first computing node to stream, via a second streaming session, second content associated with a second video game application;
retrieving from the computing memory the data specifying the values for the parameters;
transmitting, by the second computing node, based upon the data specifying the values for the parameters, instructions for configuring the first computing node to stream, via the second streaming session, the second content associated with the second video game application;
receiving, by the second computing node, via the second streaming session, a stream of the second content associated with the second video game application from the first computing node; and
broadcasting the stream of the second content to one or more nodes that have requested to receive the stream of the second content.

10. The one or more non-transitory computer-readable storage media of claim 9,
wherein transmitting instructions for configuring the first computing node to stream the second content associated with the second video game application comprises transmitting instructions to activate a game client, a video camera, a microphone, and a chat application.

11. The one or more non-transitory computer-readable storage media of claim 10,
wherein receiving a stream of the second content associated with the second video game application from the first computing node comprises receiving a stream of content generated by the game client and one or more of the video camera, the microphone, and the chat application.

12. The one or more non-transitory computer-readable storage media of claim 9,
wherein broadcasting the stream of the second content to one or more nodes that have requested to receive the stream of the second content comprises streaming the second content to the first computing node.

* * * * *